United States Patent [19]

Carrubba et al.

[11] Patent Number: 5,089,937
[45] Date of Patent: Feb. 18, 1992

[54] POWER INTERFACE APPARATUS FOR A DC POWER DISTRIBUTION SYSTEM

[75] Inventors: Vincent Carrubba, Norwalk, Conn.; Chris DiLeo, Brewster; Patrick T. Campbell, North Salem, both of N.Y.

[73] Assignee: V Band Corporation, Elmsford, N.Y.

[21] Appl. No.: 556,166

[22] Filed: Jul. 20, 1990

[51] Int. Cl.⁵ .............................................. H02B 1/18
[52] U.S. Cl. ...................................... 361/394; 307/147; 307/150; 361/334; 361/383; 361/395
[58] Field of Search ................... 307/72, 151, 75, 147, 307/150; 361/332, 334, 341, 356, 361, 380, 382, 383, 390, 391–394, 395, 399; 439/131, 140, 224

[56] References Cited

U.S. PATENT DOCUMENTS

| | | | |
|---|---|---|---|
| 4,084,214 | 4/1978 | Eppich | 361/394 |
| 4,530,066 | 7/1985 | Ohwaki | 364/708 |
| 4,680,674 | 7/1987 | Moore | 361/395 |
| 4,864,468 | 9/1989 | Weiss | 361/384 |
| 4,985,806 | 1/1991 | Mazzullo | 361/392 |
| 4,996,628 | 2/1991 | Harvey | 361/393 |

Primary Examiner—Gerald P. Tolin
Attorney, Agent, or Firm—Parmelee, Bollinger & Bramblett

[57] ABSTRACT

A power interface box is provided having a base housing an AC and a DC bus on which a plurality of separate power supply units are adapted to be positioned and interconnected to the buses in the base. A source of AC potential is applied to the AC bus for providing a source of power for the apparatus. A plurality of first female connectors are mounted in the base and coupled to the AC and DC buses. A plurality of face plates each having second male connectors mounted therein are each adapted to house a regulated power supply and to be mated with the first connector for coupling the power supplies positioned on the base to the AC and DC buses. Back studs extend from the base which are connected to the DC bus for distributing power from the power interface box.

9 Claims, 5 Drawing Sheets

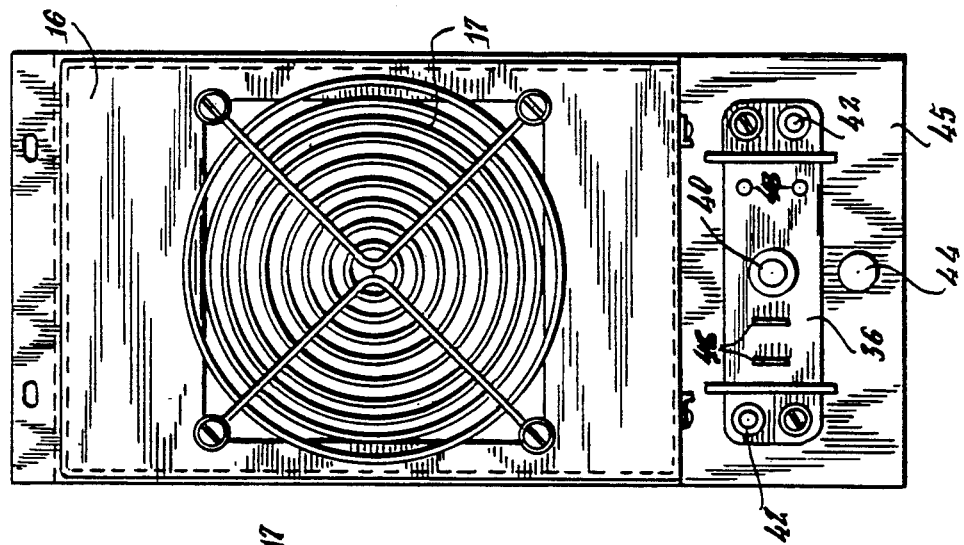
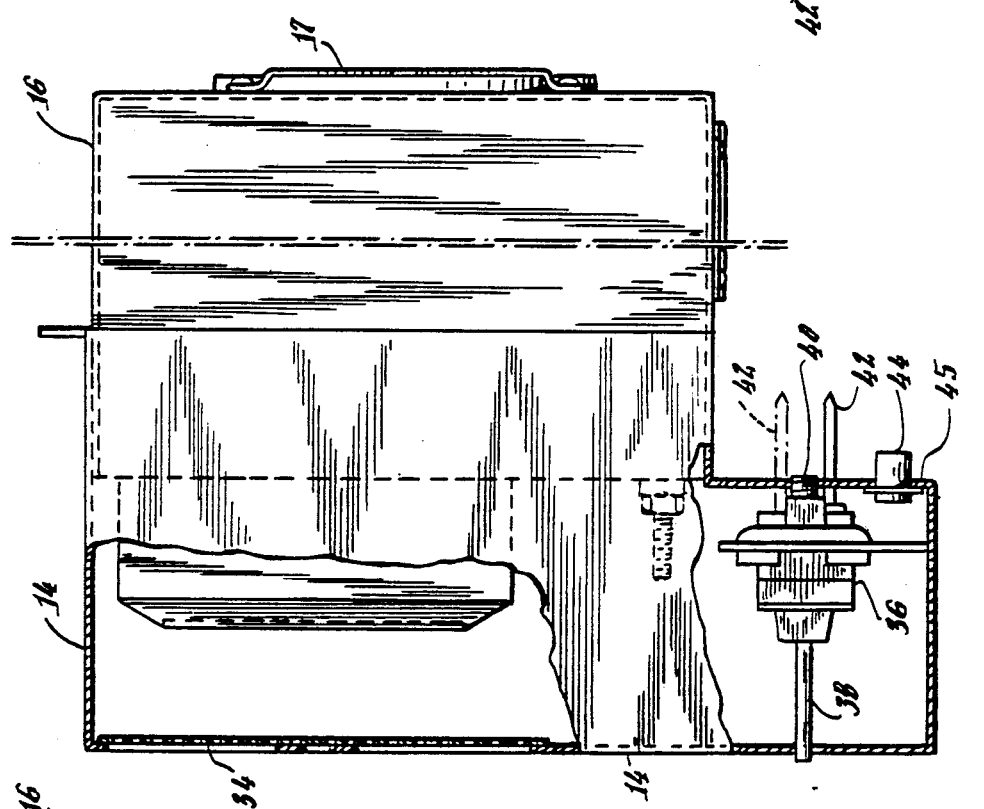
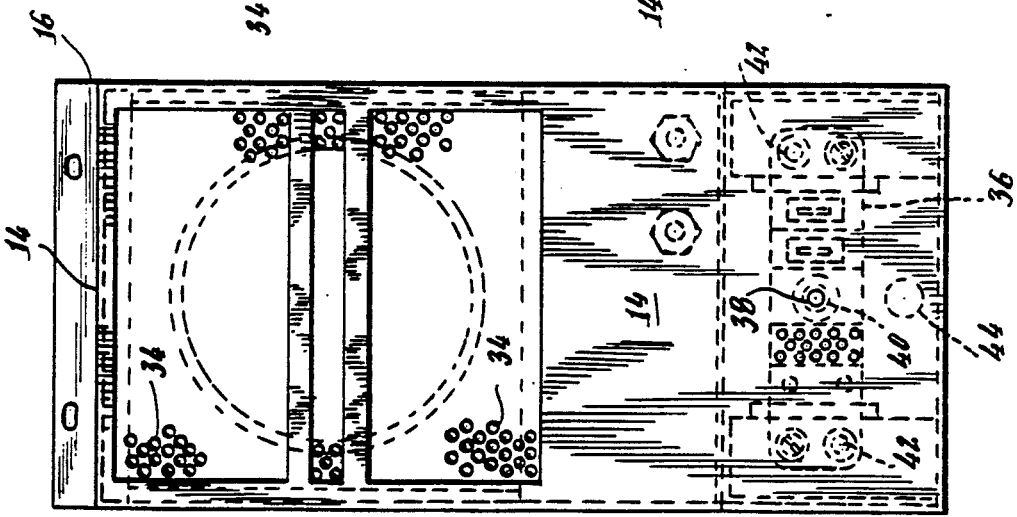

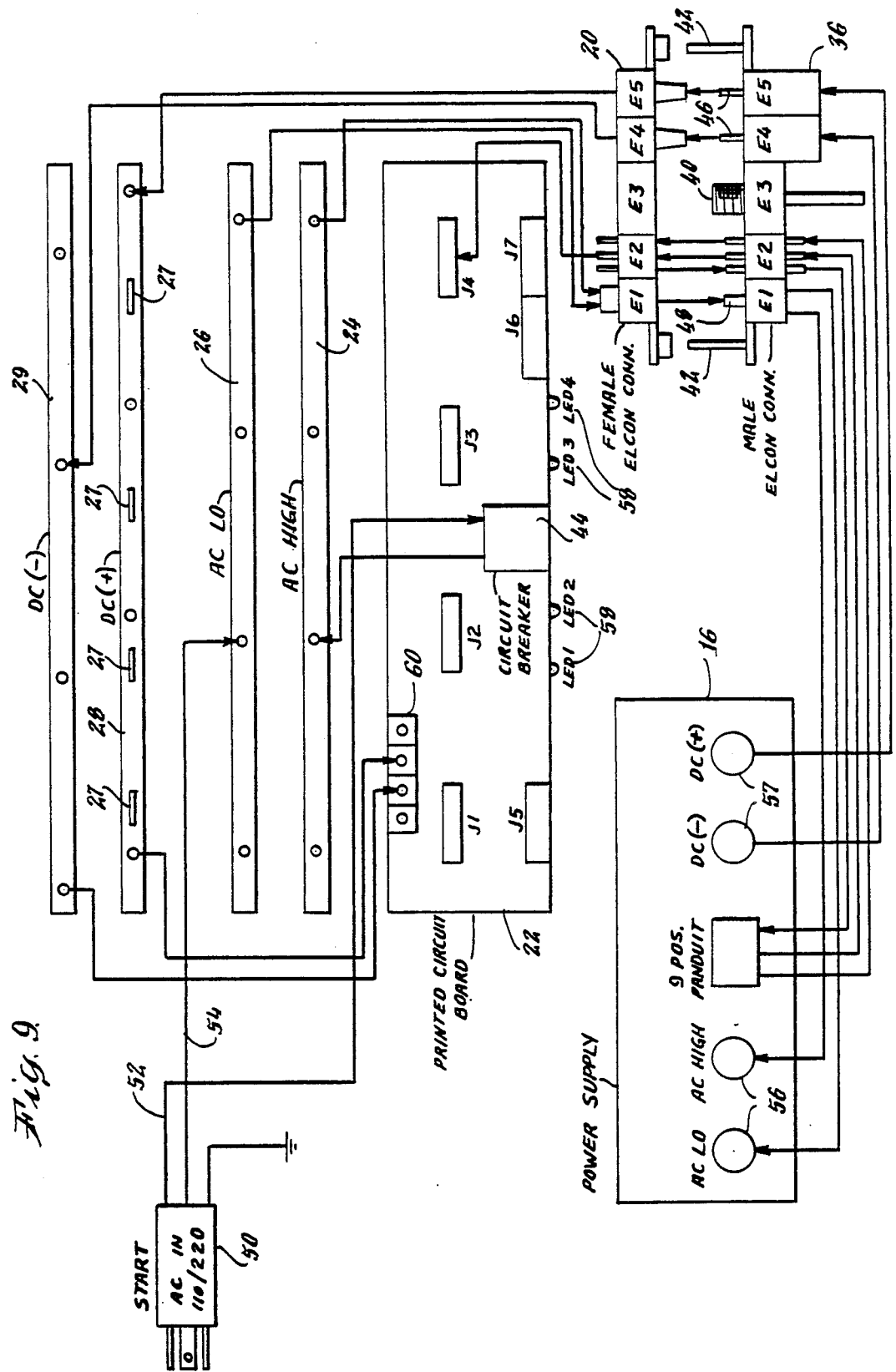

POWER INTERFACE APPARATUS FOR A DC POWER DISTRIBUTION SYSTEM

BACKGROUND OF THE INVENTION

This invention relates to a power distribution system, and more particularly to power interface apparatus which incorporate various power supplies of different manufacturers into one hot swappable automatic current sharing system which can be configured to a user's need with voltage, current, and wattage all as variables.

Electrical and electronic systems incorporating integrated circuits and electrical components have varying power requirements depending on the size and number of components to which power must be supplied. The requirements may include simple battery operated circuitry to various standard power supplies or customized supplies. Although customized power supplies can be designed for any system requirements, such customization can become extremely expensive. Using standard off the shelf power supplies which are readily available, considerably cheaper than customized power supplies, and can be more easily replaced or provided in redundancy so that the system does not fail when the power supply fails is a better solution. However, using such supplies may not allow configuration of the power supplies to the needs of the user with respect to voltage, current or wattage. In addition, individual power supply units would not be practical for supplying power of various needs to, for example, a local area telephone system for the operation of a plurality of telephone consoles connected to several hundred lines. The requirements for power would vary with the size of the system and would require some kind of redundancy to provide a backup system in the event that a power supply fails.

SUMMARY OF THE INVENTION

Accordingly, it is an object of this invention to provide a new and improved power interface apparatus which is not customized and is versatile by being capable of employing power supplies of different manufacturers which are incorporated into one hot swappable automatic current sharing system.

Another object of this invention is to provide a new and improved power interface apparatus which is capable of evenly distributing large amounts of power and can be configured to the user's needs with respect to voltage, current and wattage which are variable.

Still another object of the present invention is to provide a new and improved power interface apparatus which is modular and permits the addition or subtraction of modules readily in accordance with user's requirements as well as for replacing faulty units without system degradation or shutdown.

Yet another object of the present invention is to provide a new and improved power interface system which may be easily monitored and used.

In carrying out this invention in one illustrative embodiment thereof, a power interface apparatus is provided for a power distribution system from a plurality of separate power supply units having a base adapted to receive such units. The base has an AC and DC bus with a means for supplying an AC source to the AC bus. A plurality of first connector means are mounted in the base which are coupled to the AC and DC buses. A plurality of face plates are provided which are each adapted to house a power supply. Second connector means are mounted in each of the face plates, which are adapted to be mated with the first connector means for coupling a power supply positioned on the base to the AC and DC bus in the base. Stud means extend from the base for providing access to DC power applied to the DC bus by the power supplies positioned and coupled to the base.

BRIEF DESCRIPTION OF THE DRAWINGS

The invention, together with further aspects, objects, features and advantages thereof, may be more clearly understood from the following description taken in connection with the accompanying drawings.

FIG. 4 is a front elevation of the face plate covered power supply unit as illustrated in FIG. 1.

FIG. 5 is a side elevation of FIG. 4.

FIG. 6 is a rear elevation of FIG. 4.

FIG. 9 is a wiring diagram illustrating a power supply plugged into the base of the power interface apparatus.

DESCRIPTION OF THE PREFERRED EMBODIMENTS

Figure 1:
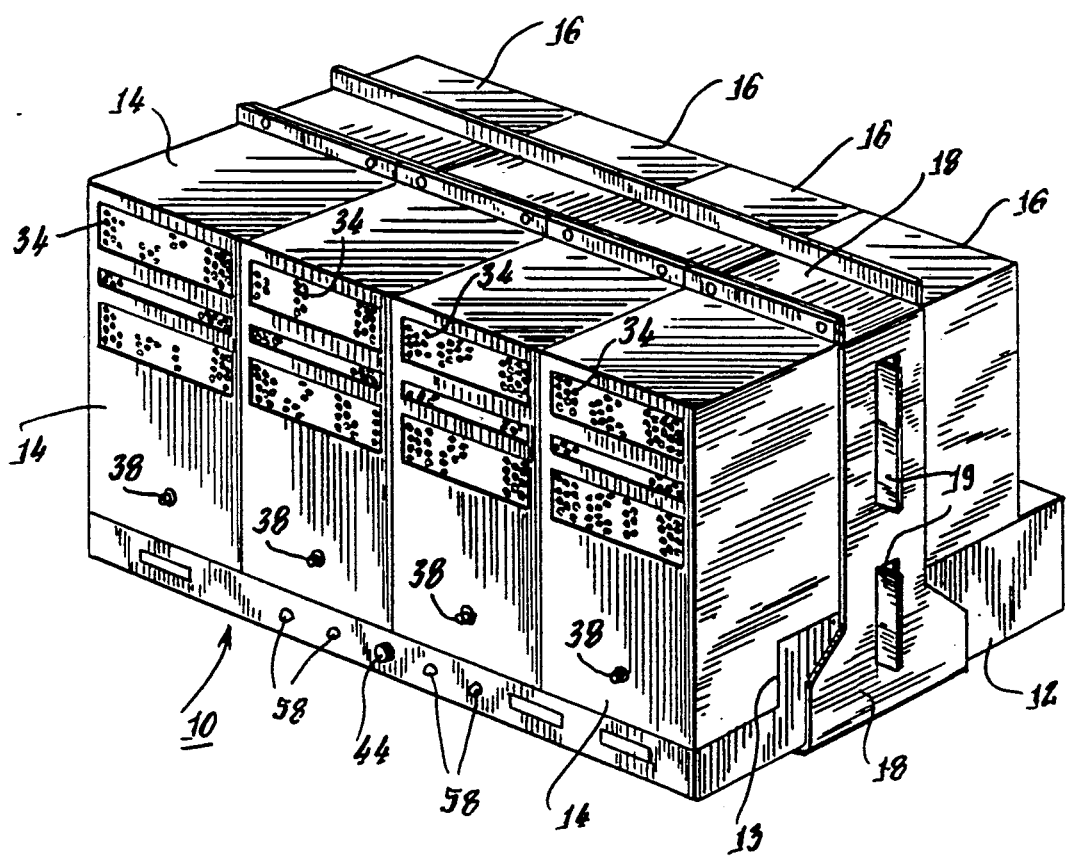
FIG. 1 is a perspective view of the power interface apparatus of the present invention having a plurality of separate power supplies mounted thereon.

Referring now to FIG. 1, the power interface apparatus, referred to generally with the reference numeral 10, includes a base 12, a plurality of face plates 14 which are coupled to and cover a plurality of separate standard power supply units 16 which are positioned on and interconnected to the base by interconnecting means to be described hereinafter and retained in position on the base 12 by the retainer band 18. The standard power supply 16 may be any commercially available units which are configured uniformly and have similar characteristics, even though the manufacturers are different and the inputs and outputs may be somewhat different. An example of one type of such supply would be the Super Switch series manufactured by Powertech, Inc. Off the shelf power supplies manufactured by AC-DC, Pioneer Magnetics and others may be used with the power interface apparatus 10.

Figure 3:
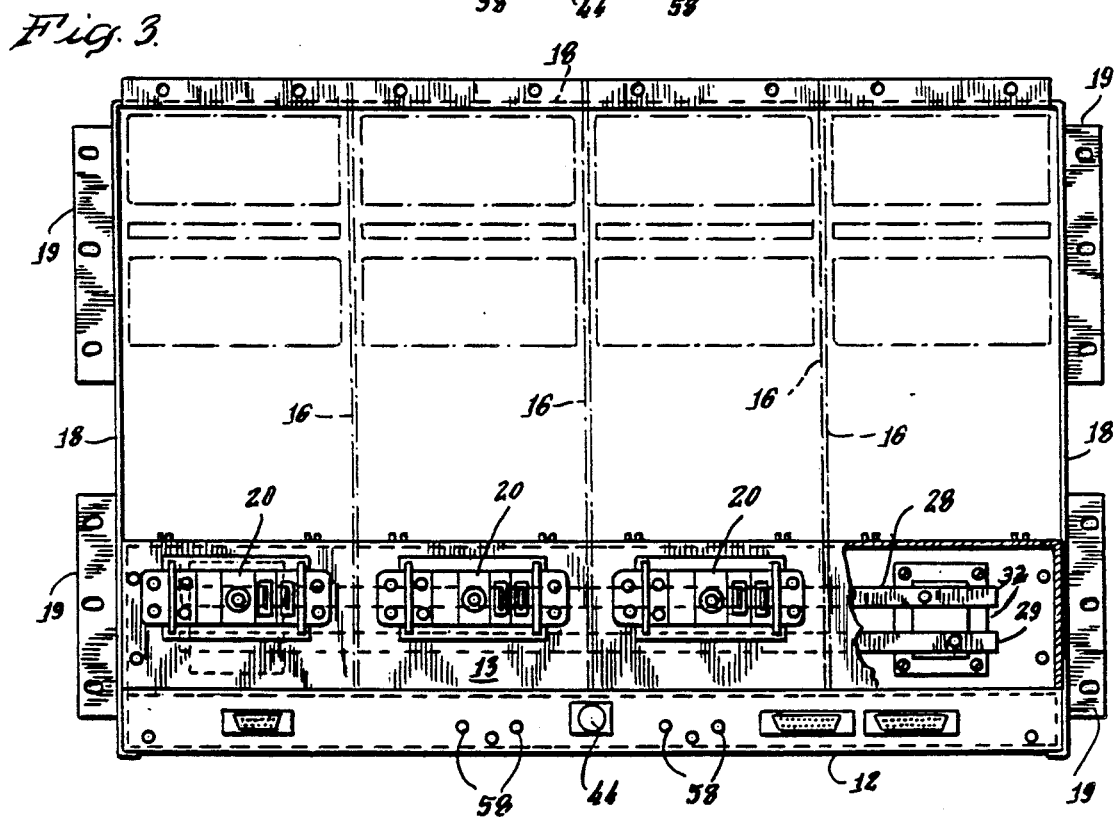
FIG. 3 is a front elevation of the base, partly broken away, as shown in FIG. 2 with the power supply module shown in phantom.

As will best be seen in the front elevational view of the base 12, as shown in FIG. 3, a plurality of female connectors 20 ar mounted in the step face 13 of the base 12 which are adapted to receive interconnection from the power supply module 16 mounted on top of the base 12. As also will be seen in FIG. 3, the retainer band 18 includes a plurality of mounting rails 19 which may be used to secure power interface apparatus in a standard NEMA 23 inch rack used for mounting modular telephone switching systems, for example, such as VIAX telephone system manufactured by V-Band Corporation the Assignee of the present invention.

Figure 2:
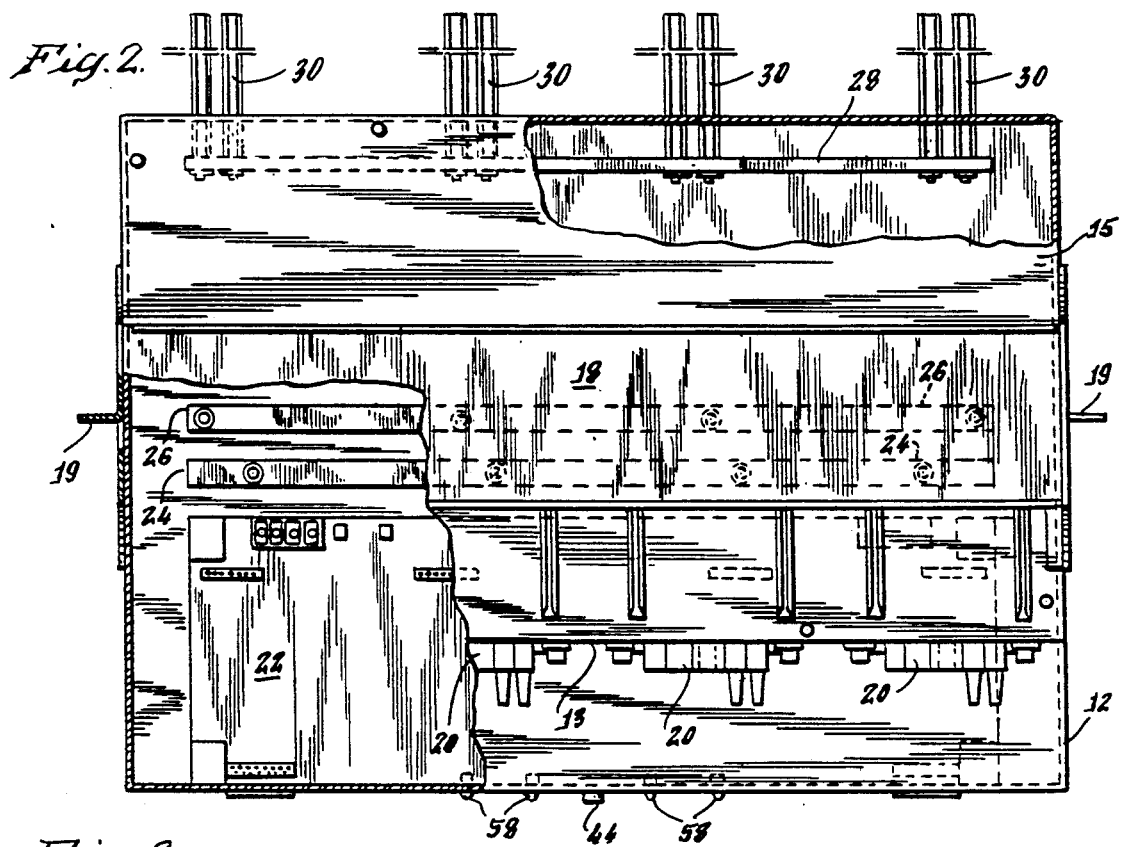
FIG. 2 is a top plan view with parts broken away showing the base of the power interface apparatus in accordance with the present invention.

In FIG. 2, from the top plan view of the base 12, a top base cover 15 is broken away revealing a printed circuit board 22 to which signals are fed from the power supply modules 16 for monitoring the status information of the individual power supplies.

As will be seen in FIG. 2, the PC board 22 is positioned below the connector means 20 in the front bottom of the base 12. The base 12 also houses an AC high bus 24 and an AC low bus 26 as well as a plus DC bus 28 and a minus bus 29 (See FIG. 3) to which a plurality of back studs 30 are connected. The DC buses 28 and 29 are mounted in the base 12 by the back studs 30 which are held and extend through an insulated pad 32 mounted on the back of the base 12 (See FIG. 3). The back studs 30 provide access to the DC power delivered from the power interface apparatus 10. The female connector 20 and its interconnections are shown in FIG. 9 which will be discussed hereinafter.

Referring now to FIGS. 4 through 6, the face plate 14 covers the back of the power supply module 16 as well as the step face 13 of the base 12 when mounted on the base 12. The face plate 14 has a perforated screen 34 mounted therein to provide ventilation for the power supply module 16 which is housed therein. The face plate 14 also carries at the lower end thereof, a male connector 36 which is adapted to mate with female connector 20 in the base 12 in order to interconnect the power supply module 16 to the elements in the base 12. As will best be seen in FIG. 5, the male connector 36 has a central shaft 38 terminating in a twist locking post 40 and a pair of guide posts 42. A fuse holder 44 housing a fuse (not shown) is positioned in the neck 45 of the face plate 14. The shaft 38 extends through the face plate which, when rotated, will lock the twist locking post 40 in a complimentary socket in the female connector 20. As is seen in FIG. 6, the male connector 36 also includes DC pins 46 and AC pins 48 as well as a plurality of signal pins which are not shown. The interconnection of the male and female connectors 36 and 20 respectively, will be apparent from a discussion of FIG. 9.

Figure 7:
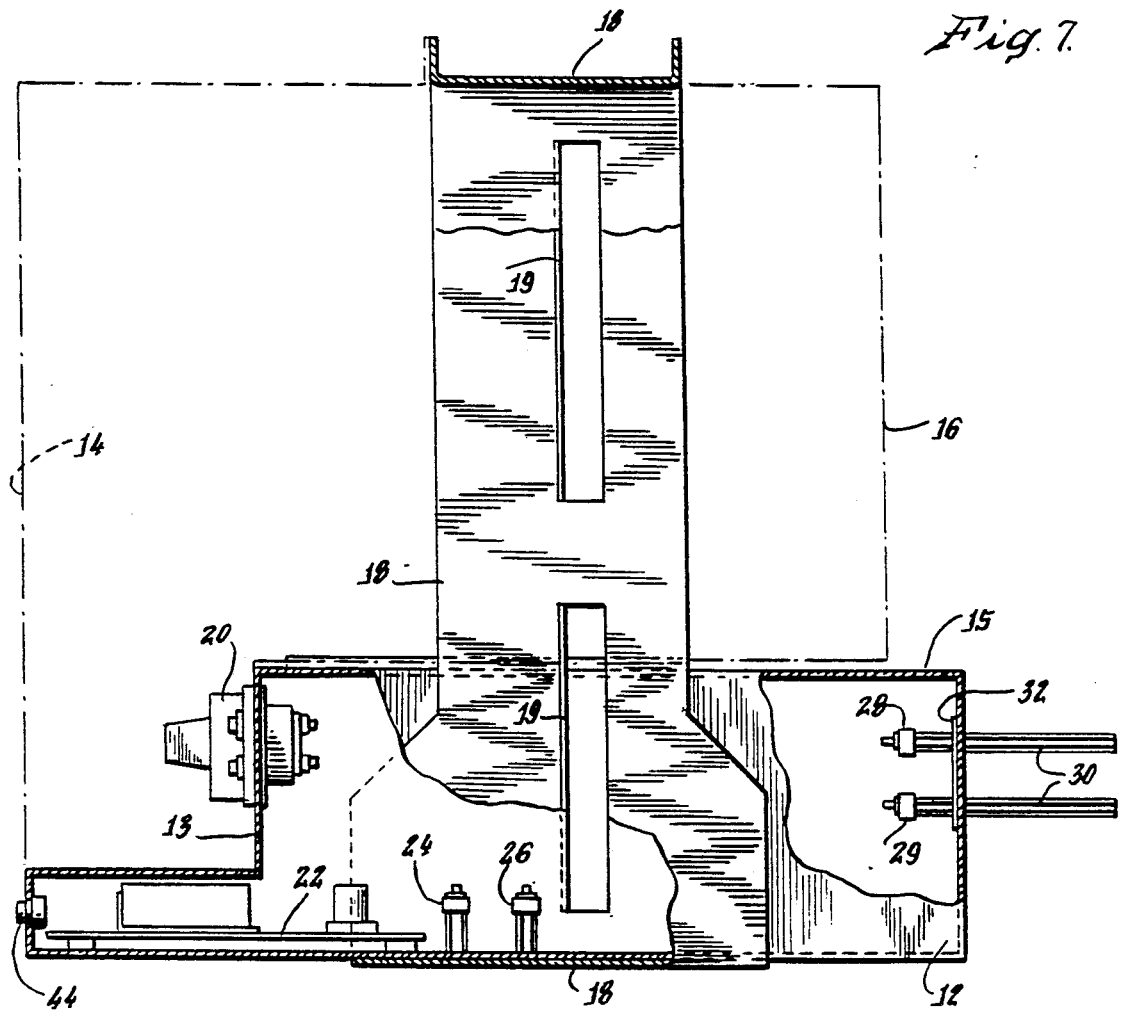
FIG. 7 is a section through a portion of the base of the power interface apparatus.
Figure 8:
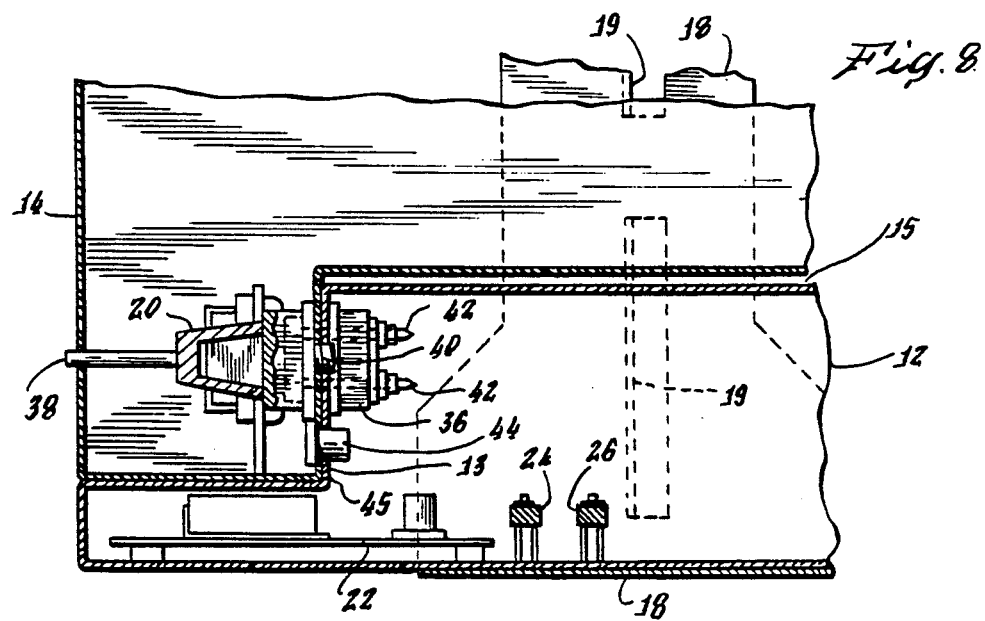
FIG. 8 is a partial section of the face plate of the power unit mounted in the base of the power interface apparatus of the present invention.

FIG. 7 shows a partial section through the base 12 and the female connector 20. FIG. 8 adds a partial section of the face plate with its male connector 36 plugged into the female connector 20 in the base. As will be seen in FIG. 8, the central shaft 38 extends through the front of the face plate 14 to permit the locking of the male and female connectors 36 and 20, respectively when a power supply is positioned on the base 12 and covered by the face plate 14.

Turning now to the wiring diagram of FIG. 9, a three prong plug 50 is plugged into a suitable source of AC power of 110 or 220 VAC. A power lead 52 is coupled to the circuit breaker 44 which is then connected to the AC high bus 24. The other power lead 54 also connects through the second pole of the circuit breaker and then to the AC low bus 26. This AC power is coupled from the AC buses 24 and 26 through the female connector 20 and male connector 36 through interconnection E1 to apply AC power to the AC terminals 56 of the power supply modules 16. The DC output terminals 57 of the power supply modules 16 are fed through the interconnection of male connector 36 and female connector 20 (interconnections E4 and E5) to the DC buses 29 and 28, respectively. The E2 interconnection represents the connection of a nine position Panduit connector to the power supply which provides unidirectional signals, some being sent and some received through the E2 interconnection which are applied to various circuits (through connectors J1, J2, J3 and J4) on the printed circuit board 22.

The circuits on the circuit board monitor are capable of regulating the various functions of the power supply modules 16. The circuit board also carries a plurality of light emitting diodes 58 which indicate when a power supply module is operating. Power for the printed circuit board 22 is applied to terminal block 60 directly from the DC buses 28 and 29. Connectors J6 and J7 receive signals from external fan assemblies (not shown) for monitoring purposes. Connector J5 provides status signals which are monitored by a computer (not shown). A plurality of isolation diodes 27 mounted on the plus DC bus 28 are provided for each of the power supply modules 16.

It will be readily apparent that a plurality of power supply modules may be mounted on and connected to the base of the power interface apparatus 10 to provide interchangeable units automatically which evenly share current via parallel outputs. As the power requirements increase, the power supplies respond proportionately and further, power supplies may be added as the load is increased. It will also be apparent that the separate power supply units can be individually replaced without system degradation or shut down. Each power supply module 16 can also be independently regulated via the various signals that travel through the nine position Panduit connector to the printed circuit board 22 and back. The modules are accordingly consistently monitored and regulated.

The power supply modules 16 also do not have to be of the same type as the power interface apparatus will accept standard switching power supplies that have similar footprints. The power interface apparatus accepts supplies with different inputs, outputs and made by different manufacturers provided that the power supplies are configured uniformly. The power interface apparatus 10 of the present invention incorporates these different power supply modules into one hot swappable automatic current sharing system. In addition, the apparatus 10 is capable of evenly distributing up to 6,000 watts of power which is over three times the amount of power which is presently available from known power shelf systems. The apparatus 10 incorporates high current connections and simple signal connections which requires only a turn of a screw to remove or connect a power supply module. In addition, the power interface apparatus may be configured to the user's needs with voltage, current and wattage all being variables in a modular system that permits the user to add or subtract power supply modules as the user's needs change. The plus DC bus bar 28 is provided with isolation diodes for each of the power supply modules. In addition, input and output connectors are provided for status input signals and identical output signals that may be input into a computer, for example, that relays status information of the individual power supplies for monitoring and regulation.

Another advantage of the present power interface apparatus is that it is not customized, and accordingly is not limited to a particular application but may used in a wide assortment of applications and provides a means for tracking the status of the system from remote terminals.

Since other changes and modifications vary to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

I claim:

1. Power interface apparatus for providing a power distribution system from a plurality of separate power supply units comprising:

a base receiving a plurality of separate power supply units;

an AC bus and a DC bus in said base;

means for applying a source of AC potential to said AC bus;

a plurality of first connector means mounted in said base coupled to said AC and DC buses;

said power supply units including a plurality of face plates each housing and covering the back of each of said power supply units;

second connector means mounted in each of said face plates and mated with said first connector means and coupling each power supply unit positioned on said base to said AC bus and said DC bus in said base; and means in said base attached to said DC bus and having external access outside side base for acessing the DC power applied to said DC bus by said plurality of power supply units positioned on and coupled to said base.

2. The power interface apparatus as claimed in claim 1 wherein said second conductor means includes a shaft having a twist lock post thereon, said first connector means having a socket for receiving said twist lock post whereby said first and second connectors may be locked on the insertion and twisting of said post into said socket.

3. The power interface apparatus as claimed in claim 1 wherein said base includes means for monitoring and regulating power supply units connected thereto and said first and second connector means include means for interconnecting power supply units positioned on said base with said base for interchanging signals to control the monitoring of power supply units connected thereto.

4. The power interface apparatus as claimed in claim 1 wherein said second connector means includes guide posts, DC pins, AC pins, signal pins and said first connector means has mating sockets for the receipt and retention of said guide posts, DC pins, AC pins and signal pins of said second connector means.

5. The power interface apparatus as claimed in claim 4 wherein said DC pins, AC pins and signal pins of said second connector means are connected to DC outputs, AC outputs and signal connections on a power supply unit coupled to said base.

6. The power interface apparatus as claimed in claim 4 wherein said first connector means contains a central twist lock socket and said second connector means has a shaft terminating in a twist lock post which when inserted in said central twist lock socket and rotated locks said first and second connector means together.

7. The power interface apparatus as claimed in claim 6 wherein said shaft extends out of said face plate when said face plate interconnects a power supply unit to said base for facilitating the release of said second from said first connector means.

8. The power interface apparatus as claimed in claim 1 wherein said means for providing external access to said DC bus comprises a plurality of back studs spaced along said DC bus and extending out of said base.

9. The power interface apparatus as claimed in claim 1 having a plurality of isolate diodes mounted on said DC bus.

* * * * *